United States Patent
Fairgrieve et al.

(10) Patent No.: US 10,518,771 B2
(45) Date of Patent: *Dec. 31, 2019

(54) SYSTEM AND METHOD FOR CONTROLLING VEHICLE SPEED

(71) Applicant: JAGUAR LAND ROVER LIMITED, Whitley, Coventry, Warwickshire (GB)

(72) Inventors: Andrew Fairgrieve, Thurlaston (GB); Daniel Woolliscroft, Alvechurch (GB); James Kelly, Dorridge (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 6 days.

This patent is subject to a terminal disclaimer.

(21) Appl. No.: 15/436,257

(22) Filed: Feb. 17, 2017

(65) Prior Publication Data
US 2017/0158201 A1 Jun. 8, 2017

Related U.S. Application Data

(63) Continuation of application No. 14/421,933, filed as application No. PCT/EP2013/067175 on Aug. 16, 2013, now Pat. No. 9,573,595.

(30) Foreign Application Priority Data

Aug. 16, 2012 (GB) .................... 1214651

(51) Int. Cl.
*B60W 30/14* (2006.01)
*B60T 8/17* (2006.01)
(Continued)

(52) U.S. Cl.
CPC .......... *B60W 30/143* (2013.01); *B60T 8/175* (2013.01); *B60W 10/04* (2013.01); *B60W 10/06* (2013.01);
(Continued)

(58) Field of Classification Search
CPC .......... B60W 30/18172; B60W 10/04; B60W 10/06; B60W 10/18; B60W 10/20;
(Continued)

(56) References Cited

U.S. PATENT DOCUMENTS

| 4,951,208 A | 8/1990 | Etoh |
| 4,987,966 A | 1/1991 | Fujita |

(Continued)

FOREIGN PATENT DOCUMENTS

| CN | 101830175 A | 9/2010 |
| EP | 1757507 A1 | 2/2007 |

(Continued)

OTHER PUBLICATIONS

International Search Report for International application No. PCT/EP2013/067175, dated Oct. 24, 2013, 4 pages.

(Continued)

*Primary Examiner* — Rodney A Butler
(74) *Attorney, Agent, or Firm* — Reising Ethington P.C.

(57) ABSTRACT

A method for operating a speed control system of a vehicle is provided. The method comprises detecting an occurrence of a slip event, of a step encounter event, or of both events at a leading wheel of the vehicle. The method also comprises predicting that the occurrence of the detected event(s) will occur at a following wheel of the vehicle. The method yet further comprises automatically controlling vehicle speed, vehicle acceleration, or both vehicle speed and acceleration in response to the detection, the prediction, or both the detection and prediction. A speed control system comprising an electronic control unit (ECU) configured to perform the above-described methodology is also provided.

17 Claims, 5 Drawing Sheets

(51) Int. Cl.
*F16H 61/02* (2006.01)
*B60W 10/06* (2006.01)
*B60W 10/18* (2012.01)
*B60W 10/20* (2006.01)
*B60W 30/18* (2012.01)
*B60W 10/04* (2006.01)
*B60T 8/175* (2006.01)
*F16H 59/66* (2006.01)

(52) U.S. Cl.
CPC ............ B60W 10/18 (2013.01); B60W 10/20 (2013.01); B60W 30/18172 (2013.01); F16H 61/0213 (2013.01); *B60T 2201/04* (2013.01); *B60T 2210/14* (2013.01); *B60T 2210/16* (2013.01); *B60T 2220/04* (2013.01); *B60T 2260/06* (2013.01); *B60W 30/18118* (2013.01); *B60W 2520/26* (2013.01); *B60W 2520/28* (2013.01); *B60W 2520/30* (2013.01); *B60W 2540/18* (2013.01); *B60W 2550/141* (2013.01); *B60W 2710/207* (2013.01); *B60W 2720/26* (2013.01); *B60W 2720/28* (2013.01); *B60W 2720/30* (2013.01); *B60Y 2200/20* (2013.01); *F16H 59/66* (2013.01); *F16H 2061/0234* (2013.01)

(58) Field of Classification Search
CPC ........... B60W 30/143; B60W 2720/26; B60W 2520/28; B60W 2520/30; B60W 2710/207; B60W 2520/26; B60W 2720/30; B60W 2540/18; B60W 30/18118; B60W 2720/28; B60W 2550/141; F16H 61/0213; F16H 59/66; B60T 8/175; B60T 2210/16; B60T 2210/14; B60T 2201/04; B60T 2220/04; B60T 2260/06; B60Y 2200/20
See application file for complete search history.

(56) References Cited

U.S. PATENT DOCUMENTS

| | | | |
|---|---|---|---|
| 5,044,660 | A | 9/1991 | Yamamura et al. |
| 9,573,595 | B2* | 2/2017 | Fairgrieve ........... F16H 61/0213 |
| 2003/0014174 | A1 | 1/2003 | Giers |
| 2003/0154012 | A1* | 8/2003 | Anwar ................ B60T 8/17616 |
| | | | 701/71 |
| 2008/0154472 | A1 | 6/2008 | Okuda et al. |
| 2011/0060478 | A1 | 3/2011 | Nickolaou |
| 2012/0271499 | A1 | 10/2012 | Inoue et al. |
| 2014/0067219 | A1* | 3/2014 | Stares .................... B60K 17/34 |
| | | | 701/69 |
| 2015/0232093 | A1 | 8/2015 | Fairgrieve et al. |

FOREIGN PATENT DOCUMENTS

| | | |
|---|---|---|
| JP | H01111540 A | 4/1989 |
| JP | H02189236 A | 7/1990 |
| JP | H0723070 B2 | 3/1995 |
| JP | H11034628 A | 2/1999 |
| JP | 2000095077 A | 4/2000 |
| JP | 200126228 A | 1/2001 |
| JP | 2009092604 A | 4/2009 |
| WO | WO0158712 A1 | 8/2001 |
| WO | WO2010146631 A1 | 12/2010 |

OTHER PUBLICATIONS

Written Opinion for International application No. PCT/EP2013/067175, dated Oct. 24, 2013, 5 pages.
Combined Search and Examination Report for application No. GB1314683.2, dated Mar. 26, 2014, 6 pages.
Japanese Office Action in Japanese with English translation for JP application No. 2015-527002, dated Mar. 15, 2016, 9 pages.
Chinese Office Action in Chinese with English translation for CN application No. 201380053429.0, dated Aug. 30, 2016, 15 pages.
Japanese Office Action corresponding to Application No. 2017-184069, dated Sep. 28, 2018, 9 pages.
Japanese Office Action in Japanese with English translation corresponding to JP application No. 2015-527002, dated Jun. 5, 2018, 7 pages.

* cited by examiner

SYSTEM AND METHOD FOR CONTROLLING VEHICLE SPEED

TECHNICAL FIELD

The present invention relates generally to vehicle speed control, and more particularly, to a method and system for controlling the speed of a vehicle capable of traversing a variety of different terrains and conditions.

BACKGROUND

In known vehicle speed control systems, typically referred to as cruise control systems, a set-speed for the vehicle may be initially set by a user (e.g., driver). Once set by the user, the vehicle speed is maintained on-road without further intervention by the user so as to improve the driving experience for the user by reducing workload. So long as the speed control system remains in an active state, the speed control system attempts to maintain the speed of the vehicle at the designated set-speed as the vehicle progresses.

One drawback of such known speed control systems, however, is that the systems may allow a user to select, and/or may maintain the vehicle speed at, a user-selected set-speed without regard to whether various conditions exist that, when encountered or met at certain vehicle speeds, may adversely affect vehicle composure and/or vehicle occupant comfort. These conditions may include, for example, those related to the terrain the vehicle is traversing, the movement of the vehicle body, and the occupancy of the vehicle (e.g., the number of vehicle occupants and their respective locations within the vehicle), to name a few. If the user selects, and/or the speed control system maintains the speed of the vehicle at, a set-speed that is too high for certain conditions when that or those conditions are encountered or met, the comfort of the vehicle occupants, as well as the composure of the vehicle, could be significantly affected unless corrective measures are taken by the user, such as, for example, the deactivation of the speed control system.

Known cruise control systems are also arranged cancel in the event that a wheel slip event is detected requiring intervention by a traction control system (TCS) or stability control system (SCS). Accordingly, they are not well suited to maintaining vehicle progress when driving in off-road conditions or on slippery roads, where such events may be relatively common.

Accordingly, there is a need for a speed control system and method for use with the same that minimizes and/or eliminates one or more of the above-identified deficiencies.

SUMMARY

According to an aspect of the present invention for which protection is sought, there is provided a method for controlling the speed of a vehicle. The method comprises: detecting an occurrence of a slip event, of a step encounter event, or of both a slip event and a step encounter event at a leading wheel of the vehicle; predicting that the occurrence of the detected slip event, step encounter, or both will occur at a following wheel of the vehicle; and automatically controlling vehicle speed, vehicle acceleration, or both vehicle speed and vehicle acceleration in response to the detection, to the prediction, or to both the detection and the prediction.

According to another aspect of the present invention for which protection is sought, there is provided a carrier medium carrying a computer readable code for controlling a vehicle to carry out the method of the invention.

According to another aspect of the present invention for which protection is sought, there is provided a speed control system for a vehicle. The system comprises an electronic control unit (ECU) that is configured to: detect an occurrence of a slip event, of a step encounter event, or of both a slip event and a step encounter event at a leading wheel of the vehicle; predict that the occurrence of the detected slip event, step encounter, or both will occur at a following wheel of the vehicle; and automatically control vehicle speed, vehicle acceleration, or both vehicle speed and vehicle acceleration in response to the detection, to the prediction, or to both the detection and the prediction.

According to another aspect of the present invention for which protection is sought, there is provided a vehicle comprising the system of the invention.

Some optional features of the various aspects of the invention are presented in the dependent claims appended hereto.

DESCRIPTION OF THE DRAWINGS

One or more embodiments of the invention will now be described, by way of example only, with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function blocks is made for ease of explanation of the manner of operation of a control system according to an embodiment of the present invention.

Figure 1:
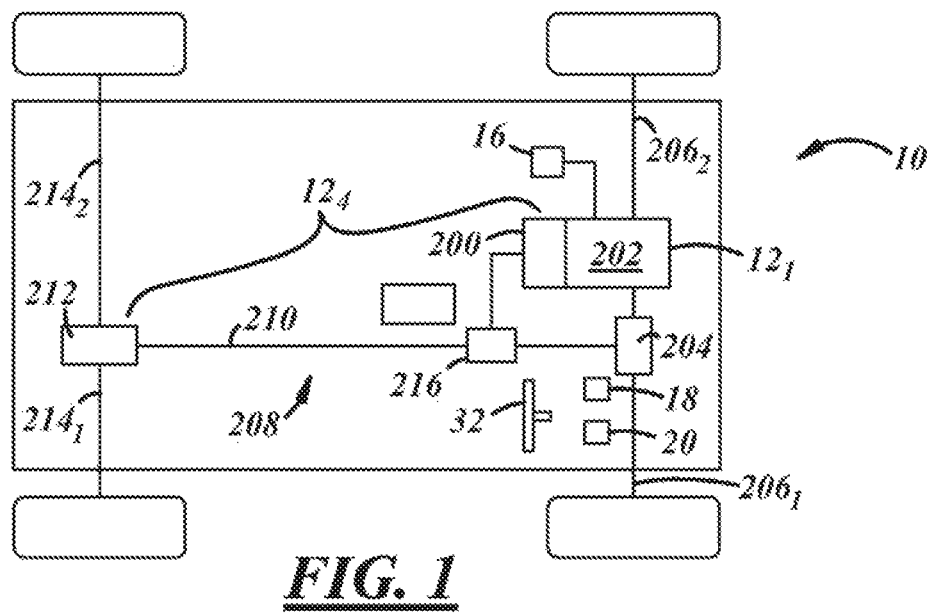
FIG. 1 is a schematic and block diagram of a vehicle.
Figure 2:
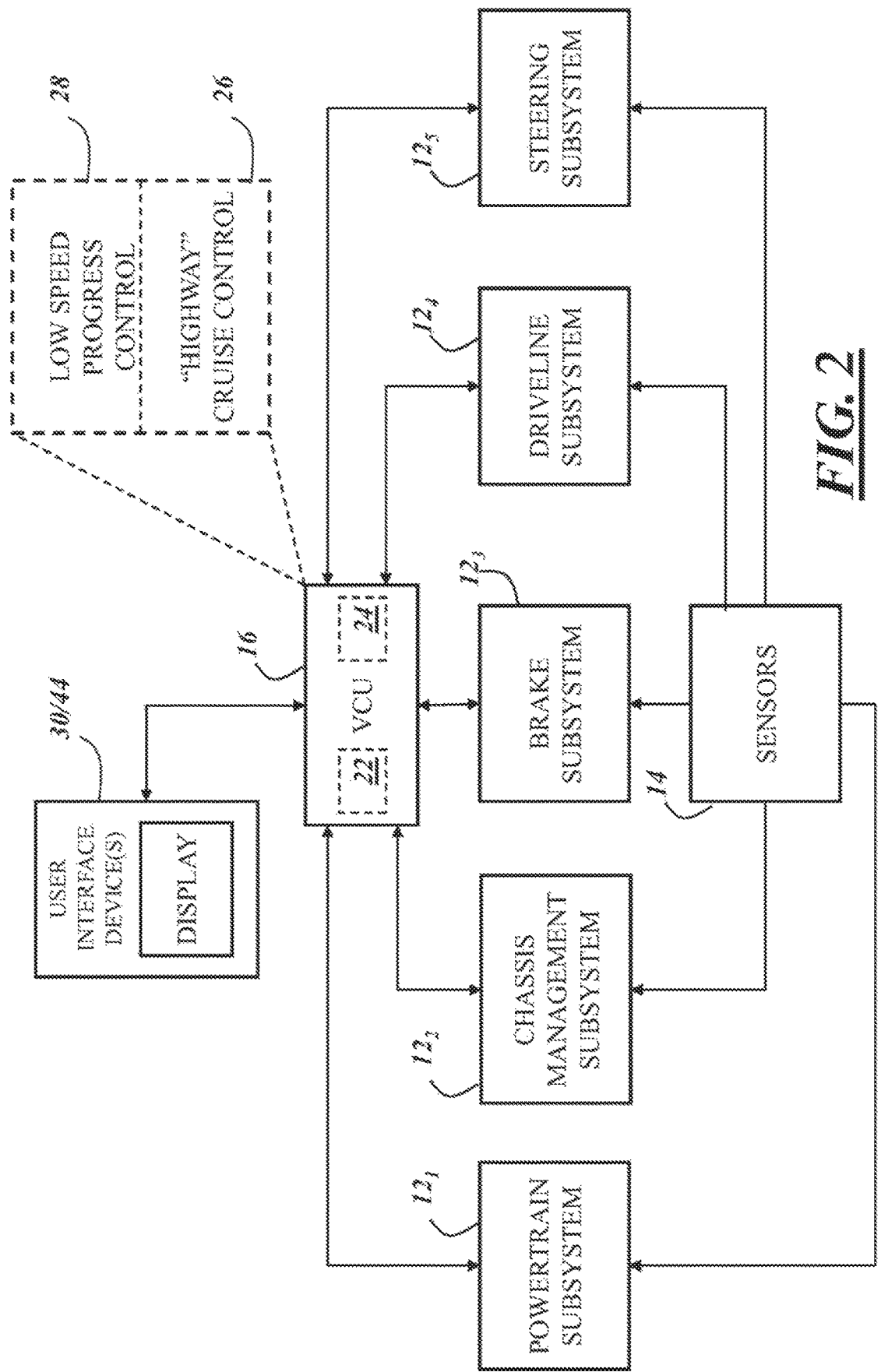
FIG. 2 is another block diagram of the vehicle illustrated in FIG. 1.

With reference to FIGS. 1 and 2, there are shown some of the components of a vehicle 10, with which the present method and system may be used. Although the following description is provided in the context of the particular vehicle 10 illustrated in FIGS. 1 and 2, it will be appreciated that this vehicle is merely an example and that other vehicles may certainly be used instead. For instance, in various embodiments, the method and system described herein may be used with any type of vehicle having an automatic, manual, or continuously variable transmission, including traditional vehicles, hybrid electric vehicles (HEVs), extended-range electric vehicles (EREVs), battery electrical vehicles (BEVs), passenger cars, sports utility vehicles (SUVs), cross-over vehicles, and trucks, to cite a few possibilities. According to one embodiment, vehicle 10 generally includes a plurality of subsystems 12, a plurality of vehicle sensors 14, and a vehicle control unit 16 (VCU 16), among any number of other components, systems, and/or devices not illustrated or otherwise described herein.

Subsystems 12 of vehicle 10 may be configured to perform or control various functions and operations relating to the vehicle and, as illustrated in FIG. 2, may include any number of subsystems, such as, for example, a powertrain subsystem $12_1$, a chassis control or management subsystem $12_2$, a brake subsystem $12_3$, a driveline subsystem $12_4$, and a steering subsystem $12_5$, to cite only a few possibilities.

As is well known in the art, powertrain subsystem 12, is configured to generate power or torque that is used to propel the vehicle. The amount of torque generated by the powertrain subsystem may also be adjusted so as to control the speed of the vehicle (e.g., to increase the speed of vehicle 10, the torque output is increased). The amount of torque that a powertrain subsystem is capable of outputting is dependent upon the particular type or design of the subsystem, as different powertrain subsystems have different maximum output torque capacities. In one embodiment, however, the maximum output capacity of powertrain subsystem 12, of vehicle 10 may be in the order of 600 Nm. As is known in the art, powertrain output torque may be measured using one or more of vehicle sensors 14 described below (e.g., an engine torque sensor, a driveline torque sensor, etc.) or other suitable sensing means and may be used for a variety of purposes by one or more components, modules, or subsystems of vehicle 10, in addition to powertrain subsystem $12_1$, including, for example and without limitation, one or more of those described below. Those having ordinary skill in the art will appreciate that powertrain subsystem 12, may be provided according to any number of different embodiments, may be connected in any number of different configurations, and may include any number of different components, like output torque sensors, control units, and/or any other suitable components known in the art. For example, in an embodiment, powertrain subsystem 12, may further include one or more electric machines, for example, one or more electric machines operable as electrical generators, that are configured to apply retarding torque to a portion of powertrain subsystem 12, and/or one or more wheels of vehicle 10 so as to cause vehicle 10 to decelerate with or without the use of brake subsystem $12_3$ (e.g., frictional braking). Accordingly, the present invention is not limited to any one particular powertrain subsystem.

Chassis management subsystem $12_2$ may be configured to perform, or may be configured to contribute to the performance of, a number of important functions, including those relating to, for example, traction control (TC), stability control systems (SCS) such as dynamic stability control (DSC), hill descent control (HDC), and steering control, to name only a few. To that end, and as is well known in the art, chassis management subsystem $12_2$ is further configured to monitor and/or control a variety of aspects or operational parameters of the vehicle using, for example, readings, signals, or information it receives from one or more of sensors 14 and/or other vehicle subsystems 12 described or identified herein. For example, subsystem $12_2$ may be configured to receive readings or other information relating to the pressure of the tires of the vehicle from, for example, tire pressure sensors associated with each tire. As such, chassis management subsystem $12_2$ may monitor the tire pressure and, if necessary, and if the vehicle is so configured, to automatically make, or cause to be made, adjustments to the pressure using an air compressor onboard the vehicle. Similarly, chassis management subsystem $12_2$ may also be configured to receive readings or other information relating to the ride height of the vehicle from, for example, one or more air suspension sensors that may be distributed about the vehicle. In such an instance, chassis management subsystem $12_2$ may monitor the ride height of the vehicle and, if necessary, and if the vehicle is so configured, to automatically make, or cause to be made, adjustments to the ride height using an air compressor (suspension compressor) onboard the vehicle. Chassis management subsystem $12_2$ may further be configured to monitor the attitude of the vehicle. More particularly, subsystem $12_2$ may receive readings or information from one or more of sensors 14 and/or subsystems 12 described or identified herein (e.g., gyro sensors, vehicle acceleration sensors, etc.) to evaluate the pitch, roll, yaw, lateral acceleration, vibration (e.g., amplitude and frequency) of the vehicle (and/or the vehicle body, in particular), and therefore, the overall attitude of the vehicle. In each instance, the information received or determined by chassis management subsystem $12_2$ may be utilized solely thereby, as described above, or may alternatively be shared with other subsystems 12 or components (e.g., VCU 16) of vehicle 10 which may use the information for any number of purposes. While only a few examples of operational parameters and/or aspects of the vehicle that chassis management subsystem $12_2$ may monitor and/or control have been provided, it will be appreciated that subsystem $12_2$ may be configured to control and/or monitor any number of other or additional parameters/aspects of vehicle 10 in the same or similar manner as that described above. As such, the present invention is not limited to the control and/or monitoring of any particular parameters/ aspects. Moreover, it will be further appreciated that chassis management subsystem $12_2$ may be provided according to any number of different embodiments and may include any number of different components, like sensors, control units, and/or any other suitable components known in the art. Accordingly, the present invention is not limited to any one particular chassis management subsystem.

As illustrated in FIG. 1, driveline subsystem $12_4$ may include a multi-ratio transmission or gearbox 200 that is mechanically coupled with an output shaft of a propulsion mechanism of powertrain subsystem $12_1$ (e.g., an engine or electric motor of powertrain subsystem $12_1$, which is identified as reference number 202 in FIG. 1). Transmission 200 is arranged to drive the front wheels of vehicle 10 by means of a front differential 204 and a pair of front drive shafts $206_1$, $206_2$. In the illustrated embodiment, driveline subsystem $12_4$ also comprises an auxiliary driveline portion 208 arranged to drive the rear wheels of vehicle 10 by means of an auxiliary driveshaft or prop-shaft 210, a rear differential 212, and a pair of rear drive shafts $214_1$, $214_2$. In various embodiments, driveline subsystem $12_4$ may be arranged to drive only the front wheels or the rear wheels, or selectable two wheel drive/four wheel drive vehicles. In an embodiment such as that illustrated in FIG. 1, transmission 200 is releasably connectable to the auxiliary driveline portion 208 by means of a transfer case or power transfer unit 216, allowing selectable two wheel drive or four wheel drive operation. In certain instances, and as is well known in the art, transfer unit 216 may be configured to operate in either a high range (HI) or low range (LO) gear ratio, which may be adjustable by driveline subsystem $12_4$ itself and/or by another component of vehicle 10, such as, for example, VCU 16. Those having ordinary skill in the art will appreciate that driveline subsystem $12_4$ may be provided according to any number of different embodiments, may be connected in any number of different configurations, and may include any number of different components, like sensors (e.g., HI/LO ratio sensor, transmission gear ratio sensors, etc.), control units, and/or any other suitable components known in the art. Accordingly, the present invention is not limited to any one particular driveline subsystem.

In addition to those subsystems described above, vehicle 10 may further comprise any number of other or additional subsystems, such as, for example, a brake subsystem $12_3$ and a steering subsystem $12_5$. For the purposes of this invention, each of the aforementioned subsystems 12, and the functionality corresponding thereto, is conventional in the art. For example, brake subsystem $12_3$ applied brake force to one or more vehicle wheels. As such, detailed descriptions will not be provided; rather, the structure and function of each identified subsystem 12 will be readily apparent to those having ordinary skill in the art.

In one embodiment, one or more of subsystems 12 may be under at least a certain degree of control by VCU 16. In such an embodiment, those subsystems 12 are electrically coupled to, and configured for communication with, VCU 16 to provide feedback to VCU 16 relating to operational or operating parameters of the vehicle, as well as to receive instructions or commands from VCU 16. Taking powertrain subsystem 12, as an example, powertrain subsystem $12_1$ may be configured to gather various types of information relating to certain operating parameters thereof, such as, for example, torque output, engine or motor speed, etc., and to then communicate that information to VCU 16. This information may be gathered from, for example, one or more of vehicle sensors 14 described below. Powertrain subsystem $12_1$ may also receive commands from VCU 16 to adjust certain operating parameters when, for example, a change in conditions dictates such a change (e.g., when a change in vehicle speed has been requested via a brake pedal (pedal 18 in FIG. 1) or accelerator pedal (pedal 20 in FIG. 1) of vehicle 10). While the description above has been with particular reference to powertrain subsystem $12_1$, it will be appreciated that the same principle applies to each such other subsystem 12 that is configured to exchange information/commands with VCU 16.

Each subsystem 12 may comprise a dedicated electronic control unit (ECU) that is configured to receive and execute instructions or commands provided by VCU 16, and/or to perform or control certain functionality independent from VCU 16. Alternatively, two or more subsystems 12 may share a single ECU, or one or more subsystems 12 may be directly controlled by the VCU 16 itself. In an embodiment wherein a subsystem 12 communicates with VCU 16 and/or other subsystems 12, such communication may be facilitated via any suitable connection, such as, for example, a controller area network (CAN) bus, a system management bus (SMBus), a proprietary communication link, or through some other arrangement known in the art.

It will be appreciated that the foregoing represents only some of the possibilities with respect to the particular subsystems of vehicle 10 that may be included, as well as the arrangement of those subsystems with VCU 16. Accordingly, it will be further appreciated that embodiments of vehicle 10 including other or additional subsystems and subsystem/VCU arrangements remain within the spirit and scope of the present invention.

Vehicle sensors 14 may comprise any number of different sensors, components, devices, modules, systems, etc. In one embodiment, some or all of sensors 14 may provide subsystems 12 and/or VCU 16 with information or input that can be used by the present method, and as such, may be electrically coupled (e.g., via wire(s) or wirelessly) to, and configured for communication with, VCU 16, one or more subsystems 12, or some other suitable device of vehicle 10. Sensors 14 may be configured to monitor, sense, detect, measure, or otherwise determine a variety of parameters relating to vehicle 10 and the operation and configuration thereof, and may include, for example and without limitation, any one or more of: wheel speed sensor(s); ambient temperature sensor(s); atmospheric pressure sensor(s); tire pressure sensor(s); gyro sensor(s) to detect yaw, roll, and pitch of the vehicle; vehicle speed sensor(s); longitudinal acceleration sensor(s); engine torque sensor(s); driveline torque sensor(s); throttle valve sensor(s); steering angle sensor(s); steering wheel speed sensor(s); gradient sensor(s); lateral acceleration sensor(s) on, for example, the stability control system (SCS); brake pedal position sensor(s); brake pedal pressure sensor(s); accelerator pedal position sensor(s); air suspension sensor(s) (i.e., ride height sensors); wheel position sensor(s); wheel articulation sensor(s); vehicle body vibration sensor(s); water detection sensor(s) (for both proximity and depth of wading events); transfer case HI-LO ratio sensor(s); air intake path sensor(s); vehicle occupancy sensor(s); and longitudinal, lateral, and vertical motion sensor(s), among others known in the art.

The sensors identified above, as well as any other sensors that may provide information that can be used by the present method, may be embodied in hardware, software, firmware, or some combination thereof. Sensors 14 may directly sense or measure the conditions for which they are provided, or they may indirectly evaluate such conditions based on information provided by other sensors, components, devices, modules, systems, etc. Further, these sensors may be directly coupled to VCU 16 and/or to one or more of vehicle subsystems 12, indirectly coupled thereto via other electronic devices, vehicle communications bus, network, etc., or coupled in accordance with some other arrangement known in the art Some or all of these sensors may be integrated within one or more of the vehicle subsystems 12 identified above, may be standalone components, or may be provided in accordance with some other arrangement. Finally, it is possible for any of the various sensor readings used in the present method to be provided by some other component, module, device, subsystem, etc. of vehicle 10 instead of being directly provided by an actual sensor element. For example, VCU 16 may receive certain information from the ECU of a subsystem 12 rather than directly from a sensor 14. It should be appreciated that the foregoing scenarios represent only some of the possibilities, as vehicle 10 is not limited to any particular sensor(s) or sensor arrangement(s); rather any suitable embodiment may be used.

VCU 16 may comprise any suitable ECU, and may include any variety of electronic process devices, memory devices, input/output (I/O) devices, and/or other known components, and perform various control and/or communication related functions. In one embodiment, VCU 16 includes an electronic memory device 22 that may store various information, sensor readings (e.g., such as those generated by vehicle sensors 14), look-up tables or other data structures, algorithms (e.g., the algorithms embodied in the method described below), etc. In an embodiment, memory device 22 comprises a carrier medium carrying a computer-readable code for controlling the vehicle to carry out the method described below. Memory device 22 may also store pertinent characteristics and background information pertaining to vehicle 10 and subsystems 12. VCU 16 may also include an electronic processing device 24 (e.g., a microprocessor, a microcontroller, an application specific integrated circuit (ASIC), etc.) that executes instructions for software, firmware, programs, algorithms, scripts, applications, etc. that are stored in memory device 22 and may govern the methods described herein. As described above, VCU 16 may be electronically connected to other vehicle devices, modules, subsystems, and components (e.g., sensors) via suitable vehicle communications and can interact with them when or as required. In addition to the functionality that may be performed by VCU 16 described elsewhere herein, in one embodiment, VCU 16 may also be responsible for various functionality described above with respect to subsystems 12, especially when those subsystems are not also configured to do so. These are, of course, only some of the possible arrangements, functions, and capabilities of VCU 16, as other embodiments could also be used. Depending on the particular embodiment, VCU 16 may be a stand-alone vehicle electronic module, may be incorporated or included within another vehicle electronic module (e.g., in one or more of the subsystems 12 identified above), or may be otherwise arranged and configured in a manner known in the art. Accordingly, VCU 16 is not limited to any one particular embodiment or arrangement.

In addition to the components and systems described above, in one embodiment, vehicle 10 may further comprise one or more vehicle speed control systems. For example and with continued reference to FIG. 2, in one embodiment, vehicle 10 may further comprise a cruise control system 26, also referred to as an "on-highway" or "on-road" cruise control system, and a low-speed progress (LSP) control system 28, which may be referred to an "off-highway" or "off-road" progress control system.

On-highway cruise control system 26, which may comprise any number of conventional cruise control systems known in the art, is operable to automatically maintain vehicle speed at a desired "set-speed" set by the user. Such systems are generally limited in their use in that the vehicle must be travelling above a certain minimum threshold speed (e.g., 30 mph (approximately 50 kph)) for the system to be operable. As such, these systems are particularly suited for use in highway driving, or at least driving wherein there is not a lot of repeated starting and stopping, and that permits the vehicle to travel at a relatively high speed. As is known in the art, on-highway cruise control system 26 may include a dedicated or standalone ECU configured to execute and perform the functionality of the system, or alternatively, the functionality of cruise control system 26 may be integrated into another subsystem 12 of vehicle 10 (e.g., powertrain subsystem $12_1$), or for example, VCU 16 (as is illustrated in FIG. 2).

Figure 3:
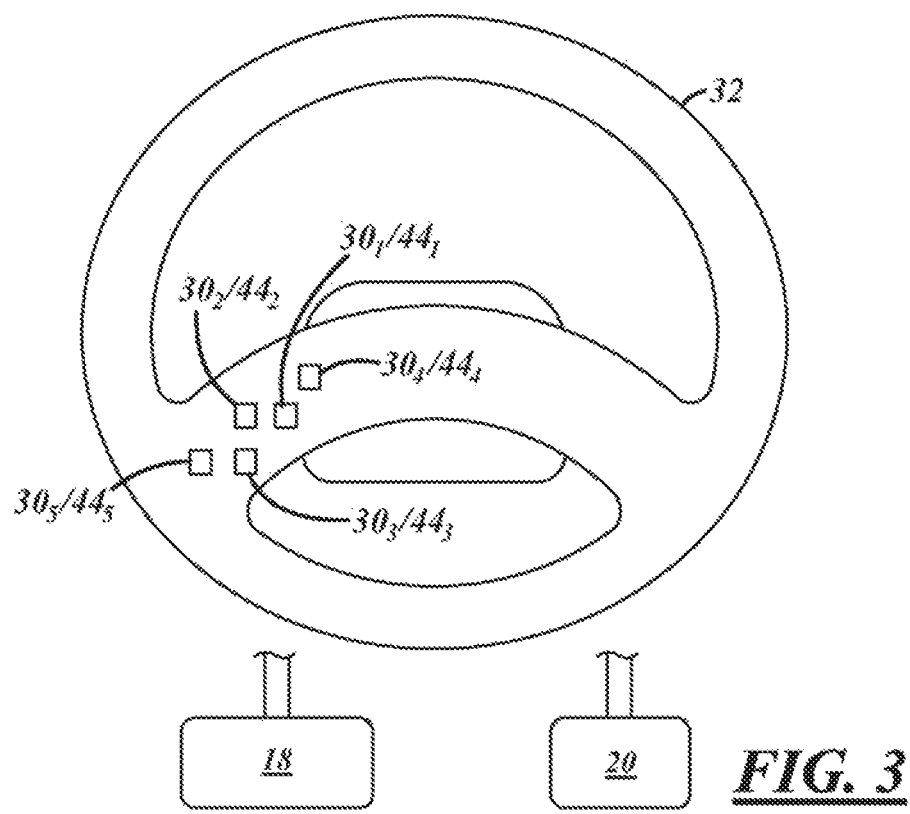
FIG. 3 is a diagram of a steering wheel for use with a vehicle, such as the vehicle illustrated in FIGS. 1 and 2.

Further, and as is known in the art, cruise control system 26 may include one or more user interface devices 30 that may be used by the user (e.g., driver) to interact with system 26 (e.g., the ECU thereof), and in certain embodiments, that allow the system to interact with the user. For example, these devices may allow a user to activate/deactivate system 26 and set and/or adjust the set-speed of the system, to cite a few possibilities. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, center console, etc.). For instance, and with reference FIG. 3, the steering wheel of vehicle 10 (i.e., steering wheel 32 in FIG. 1) may be configured with a plurality user interface devices of cruise control system 26 in the form of pushbuttons. One such device may be a "set speed" button 30, that when manipulated in a particular manner may activate the operation of cruise control system 26 and also set the desired set-speed. Cruise control system 26 may further comprise one or more other user-selectable interface devices (e.g., buttons) to allow the user to increase or decrease the set-speed of the system. For example, a "+" button $30_2$ may be provided to allow the user to increase the set-speed in discrete increments (e.g., 1 mph (or 1 kph)), and a "−" button $30_3$ to allow the user to decrease the set-speed in the same or different discrete increments. Alternatively, the "+" and "−" buttons $30_2$, $30_3$ may be integrated into a single user-selectable device. Additional user-selectable interface devices of system 26 may include, for example, a "cancel" button $30_4$ to deactivate or suspend the system, as well as a "resume" button $30_5$ to allow for the system to be re-activated following a temporary suspension or deactivation of the system function.

It should be appreciated that the foregoing scenarios represent only some of the possibilities of cruise control system 26 and the user interface devices thereof, as vehicle 10 is not limited to any particular cruise control system or user interface device or arrangement; rather, any suitable embodiments may be used.

LSP control system 28 provides a speed control system that enables, for example, the user of a vehicle equipped with such a system to select a very low target speed or set-speed at which the vehicle can progress without any pedal inputs being required by the user. This low-speed progress control function differs from that of cruise control system 26 in that unlike cruise control system 26, the vehicle need not be travelling at relatively high speeds (e.g., 30 mph (approximately 50 kph)) for the system to be operable (although system 28 may be configured to facilitate automated speed control at speeds from rest to around 30 mph (approximately 50 kph) or more, and therefore, is not limited to "low speed" operation). Furthermore, known on-highway cruise control systems are configured so that in the event the user depresses the brake or the clutch pedals, for example, the on-road cruise control function is cancelled and the vehicle reverts to a manual mode of operation requiring user pedal input to maintain vehicle speed. In addition, in at least certain cruise control systems, the detection of a wheel slip event, which may be initiated by a loss of traction, may also have the effect of cancelling the cruise control function. LSP control system 28 may also differ from such cruise control systems in that, in at least one embodiment, it is configured in such a way that the speed control function provided thereby is not cancelled or deactivated in response to those events described above. In an embodiment, LSP control system 28 is particularly suited for use in off-road or off-highway driving.

In one embodiment, LSP control system 28 includes, among potentially other components, an ECU 42 (shown, in the illustrated embodiment and for reasons described below, as comprising VCU 16) and one or more user input devices 44. ECU 42 may include any variety of electronic processing devices, memory or storage devices, input/output (I/O) devices, and any other known components, and may perform any number of functions of LSP control system 28, including those described below and embodied in the present method. To that end, ECU 42 may be configured to receive information from a variety of sources (e.g., vehicle sensors 14, vehicle subsystems 12, user input devices 44) and to evaluate, analyze, and/or process that information in an effort to control or monitor one or more operational aspects of vehicle 10, such as, for example: determining whether certain conditions relating to the vehicle and/or the operation thereof are met; automatically determining a maximum set-speed for the vehicle and/or adjusting the set-speed of the vehicle when it is determined that certain conditions are met; determining the type and/or characteristics of the terrain over which vehicle 10 is travelling; determining the number of occupants of the vehicle and their respective location(s) within the vehicle cabin (e.g., front seat, back seat, etc.); determining the identity of the driver of the vehicle; determining or detecting movement of the vehicle body; selecting a desired set-speed for system 28 from a plurality of predefined set-speeds; determining whether a particular set-speed is appropriate for vehicle 10 and/or whether vehicle 10 is appropriately configured for a particular set-speed; etc. Further, in one embodiment, ECU 42 is configured to carry out or perform one or more steps of the present method described in greater detail below. It should be appreciated that ECU 42 may be a standalone electronic module or may be integrated or incorporated into either another subsystem 12 of vehicle 10 or, for example, VCU 16. For purposes of illustration and clarity, the description below will be with respect to an embodiment wherein the functionality of ECU 42 is integrated or incorporated into VCU 16, such that, as illustrated in FIG. 2, VCU 16 comprises the ECU of LSP control system 28. Accordingly, in such an embodiment, VCU 16, and a memory device thereof or accessible thereby (e.g., memory device 22), in particular, stores various information, data (e.g., predefined set-speeds), sensor readings, look-up tables or other data structures, algorithms, software, and the like, required for performing the functionality of LSP control system 28, including that embodied in the method described below.

As with on-highway cruise control system 26 described above, LSP control system 28 further comprises one or more user interface devices 44 that may be used by a user to interact with the system 28, and in certain embodiments, to allow the system 28 to interact with the user. These devices may allow the user to, for example, activate/deactivate LSP control system 28, set and/or adjust the set-speed of the system, select a desired set-speed from a plurality of predefined set-speeds, switch between two or more predefined set-speeds, and otherwise interact with system 28 as may be described below. These user interface devices may also allow for system 28 to provide certain notifications, alerts, messages, requests, etc. to the user. Each of these devices may take any number of forms, such as, for example and without limitation, one or more of: a pushbutton; a switch; a touch screen; a visual display; a speaker; a heads-up display; a keypad; a keyboard; or any other suitable device. Additionally, these devices may be located at any number of locations within the vehicle cabin and in relatively close proximity to the user (e.g., steering wheel, steering column, dashboard, etc.). In one embodiment, user interface devices 30, 44 of on-highway cruise control system 26 and LSP control system 28, respectively, are arranged adjacent to one another within vehicle 10, and, in one embodiment, on steering wheel 32 of vehicle 10. However, in other embodiments, such as, for example, that described herein, on-highway cruise control system 26 and LSP control system 28 may share some or all of the same user interface devices. In such an embodiment, an additional user-selectable device, such as a switch, pushbutton, or any other suitable device may be provided to switch between the two speed control systems. Accordingly, in the embodiment illustrated in FIG. 3, those user interface devices $30_1$-$30_5$ described above with respect to cruise control system 26 may also be used in the operation of LSP control system 28, and as such, may also be referred to as user interface devices $44_1$-$44_5$ when discussed in the context of system 28.

For purposes of illustration and in addition to the functionality of LSP control system 28 described below, a description of the general operation of one embodiment of LSP control system 28 will now be provided. First, VCU 16, which in the embodiment described herein comprises the ECU of LSP control system 28, determines the desired speed at which the vehicle is to travel (referred to herein as "the desired set-speed"). This may be a set-speed selected by the user via user interface devices 44, or alternatively, VCU 16 may be configured to automatically determine or select a desired set-speed based on certain conditions or factors and without any user involvement. In either instance, in response to the selection of the desired set-speed, VCU 16 is configured to cause the vehicle to operate in accordance with the desired set-speed by effecting the application of selective powertrain, traction control, and/or braking actions to the wheels of the vehicle, collectively, or individually, to either achieve or maintain the vehicle at the desired set-speed. In one embodiment, this may comprise VCU 16 generating and sending appropriate commands to the appropriate subsystems 12 (such as powertrain subsystem 12, and brake subsystem $12_3$), for example, and/or directly controlling the operation of one or more components, modules, subsystems, etc. of vehicle 10.

Figure 4:
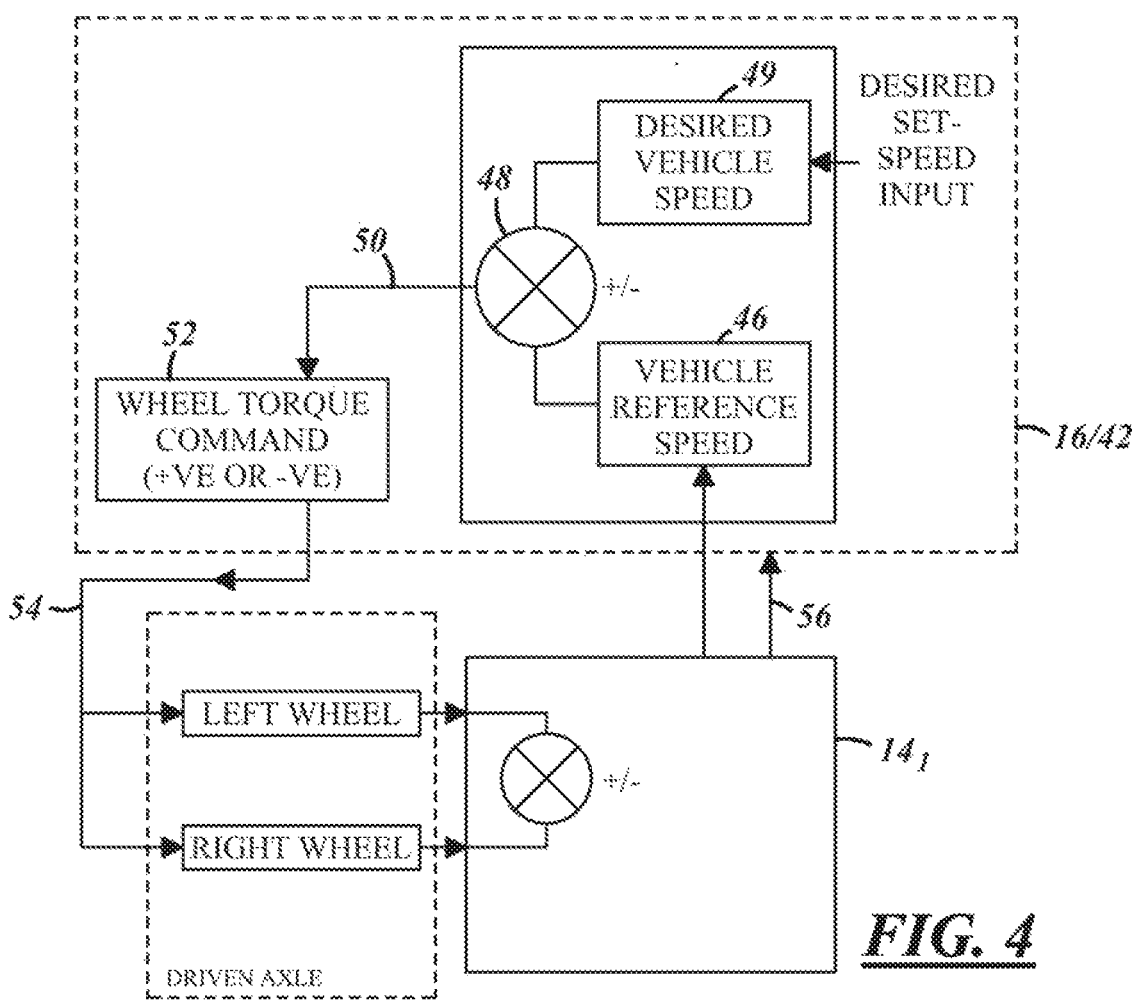
FIG. 4 is a schematic and block diagram illustrating the operation of an example of a speed control system of a vehicle, such as the vehicle illustrated in FIGS. 1 and 2.

More particularly, and with reference to FIG. 4, once the desired set-speed is determined, a vehicle speed sensor (identified as sensor 14, in FIG. 4) associated with the vehicle chassis or driveline provides a signal 46 indicative of vehicle speed to VCU 16. In one embodiment, VCU 16 includes a comparator 48 which compares the desired set-speed (represented with reference numeral 49 in FIG. 4) with the measured speed 46, and provides an output signal 50 indicative of the comparison. The output signal 50 is provided to an evaluator unit 52, which interprets the output signal 50 as either a demand for additional torque to be applied to the vehicle wheels by, for example, powertrain subsystem $12_1$, or for a reduction in torque to be applied to the vehicle wheels, by, for example, brake subsystem $12_3$, depending on whether the vehicle speed needs to be increased or decreased to maintain or achieve the desired set-speed. An output 54 from the evaluator unit 52 is then provided to one or more subsystems 12 so as to manage the torque applied to the wheels, depending on whether there is a positive or negative demand for torque from the evaluator unit 52. In order to initiate the necessary positive or negative torque being applied to the wheels, the evaluator unit 52 may either command that additional power is applied to the vehicle wheels or that a braking force is applied to the vehicle wheels, either or both of which may be used to implement the change in torque that is necessary to achieve or maintain the desired vehicle set-speed. Synchronized application of positive and negative torque to the wheels control the net torque applied thereto and is commanded by the LSP control system 28 to maintain vehicle stability and composure and regulate torque applied across each axle, in particular in the event of a slip event occurring at one or more wheels. In certain instances, VCU 16 may also receive a signal 56 indicative of a wheel slip event having occurred. In such embodiments, during a wheel slip event, VCU 16 continues to compare the measured vehicle speed with the desired set-speed, and continues to control automatically the torque applied across the vehicle wheels so as to maintain vehicle speed at the desired set-speed and manage the slip event.

In addition to the functionality described above, in one embodiment, LSP control system 28 may be further configured to detect, sense, derive, or otherwise determine information or condition relating to the terrain over which vehicle 10 is travelling (e.g., surface type, terrain classification, terrain or surface roughness, etc.). In accordance with one embodiment, VCU 16 may be configured to perform this function and to do so in a number of ways. One such way is that described in UK Published Application No. GB2492748A published on 16 Jan. 2013, the entire contents of which are incorporated herein by reference. More particularly, in one embodiment, information relating to a variety of different parameters associated with the vehicle are received or acquired from a plurality of vehicle sensors and/or various vehicle subsystems, including, for example, some or all of those sensors 14 and/or subsystems 12 described above. The received information is then evaluated and used to determine one or more terrain indicators, which may represent the type of terrain and, in certain instances, one or more characteristics thereof, such as, for example, the classification, roughness, etc. of the terrain.

More specifically, in one embodiment, the speed control system (e.g., VCU 16) may include an evaluation means in the form of an estimator module to which the information acquired or received from one or more sensors 14 and/or subsystems 12 (collectively referred to as "sensor/subsystem outputs" below) is provided. Within a first stage of the estimator module, various ones of the sensor/subsystem outputs are used to derive a number of terrain indicators. In the first stage, vehicle speed is derived from wheel speed sensors, wheel acceleration is derived from wheel speed sensors, the longitudinal force on the wheels is derived from a vehicle longitudinal acceleration sensor, and the torque at which wheel slip occurs (if wheel slip occurs) is derived from a powertrain torque signal provided by the powertrain subsystem and additionally or alternatively from a torque signal provided by the driveline subsystem (e.g., transmission), and from motion sensors to detect yaw, pitch and roll. Other calculations performed within the first stage of the estimator module include the wheel inertia torque (the torque associated with accelerating or decelerating the rotating wheels), "continuity of progress" (the assessment of whether the vehicle is repeatedly starting and stopping, for example as may be the case when the vehicle is travelling over rocky terrain), aerodynamic drag, and lateral vehicle acceleration.

The estimator module also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel (based on the lateral acceleration and the output from a steering wheel sensor and/or steering column sensor), the wheel longitudinal slip (based on the longitudinal force on the wheels, the wheel acceleration, stability control system (SCS) activity and a signal indicative of whether wheel slip has occurred), lateral friction (calculated from the measured lateral acceleration and the yaw versus the predicted lateral acceleration and yaw), and corrugation detection (high frequency, low amplitude vertical wheel excitement indicative of a washboard type surface). The SCS activity signal is derived from several outputs from the ECU of a stability control system (SCS), which contains a dynamic stability control (DSC) function, a terrain control (TC) function, anti-lock braking system (ABS) and hill descent control (HDC) algorithms, indicating DSC activity, TC activity, ABS activity, brake interventions on individual wheels, and powertrain torque reduction requests from the SCS ECU to the powertrain subsystem. All these indicate a slip event has occurred and the SCS ECU has taken action to control it. The estimator module also uses the outputs from wheel speed sensors and in a four wheel vehicle, compares outputs across each axle and from front to rear on each side, to determine a wheel speed variation and corrugation detection signal.

In one embodiment, and in addition to the estimator module, a road roughness module may also be included for calculating the terrain roughness based on air suspension sensors (the ride height or suspension articulation sensors) and wheel accelerometers. In such an embodiment, a terrain indicator signal in the form of a roughness output signal is output from the road roughness module.

The estimates for the wheel longitudinal slip and the lateral friction estimation are compared with one another within the estimator module as a plausibility check. Calculations for wheel speed variation and corrugation output, the surface rolling resistance estimation, the wheel longitudinal slip and the corrugation detection, together with the friction plausibility check, are then output from the estimator module and provide terrain indicator output signals, indicative of the nature of the terrain over which the vehicle is travelling, for further processing by VCU 16. For example, the terrain indicators may be used to determine which of a plurality of vehicle subsystem control modes (e.g., terrain modes) is most appropriate based on the indicators of the type of terrain over which the vehicle is travelling, and to then automatically control the appropriate subsystems 12 accordingly.

In another embodiment, rather than LSP control system 28 performing the above-described terrain sensing/detecting functionality, another component, module, or subsystem of vehicle 10, such as, for example VCU 16 (in the case where it does not perform the functionality of LSP control system 28), chassis management subsystem 12$_2$, or another suitable component may be appropriately configured to do so, and such other embodiments remain within the spirit and scope of the present invention.

It should be appreciated that the foregoing description of the arrangement, functionality, and capability of LSP control system 28 has been provided for purposes of example and illustration only and is not meant to be limiting in nature. Accordingly, LSP control system 28 is not intended to be limited to any one particular embodiment or arrangement.

Again, the preceding description of vehicle 10 and the illustrations in FIGS. 1 and 2 are only intended to illustrate one potential vehicle arrangement and to do so in a general way. Any number of other vehicle arrangements and architectures, including those that differ significantly from the one shown in FIGS. 1 and 2, may be used instead.

As used herein, the phrase slip event includes, but is not limited to, slip between a vehicle tire and a terrain or ground below the vehicle tire when the force exerted by the vehicle tire exceeds the traction available to the vehicle tire, or another type of similar event; and the phrase step encounter event includes, but is not limited to, a boulder encounter, a rock encounter, a curb encounter, a pothole encounter, or another type of similar encounter. Steps, curbs, boulders and potholes may be considered as a sudden delta in the surface or terrain over which the vehicle is traversing, they are within the ground clearance of the vehicle. They are typically described as having vertical (or almost so) rising/ falling edges. The step could affect just the left wheels, just the right wheels or both left and right wheels. The vehicle may approach the step perpendicular, or have an angle of incidence of 45° or more.

Figure 5:
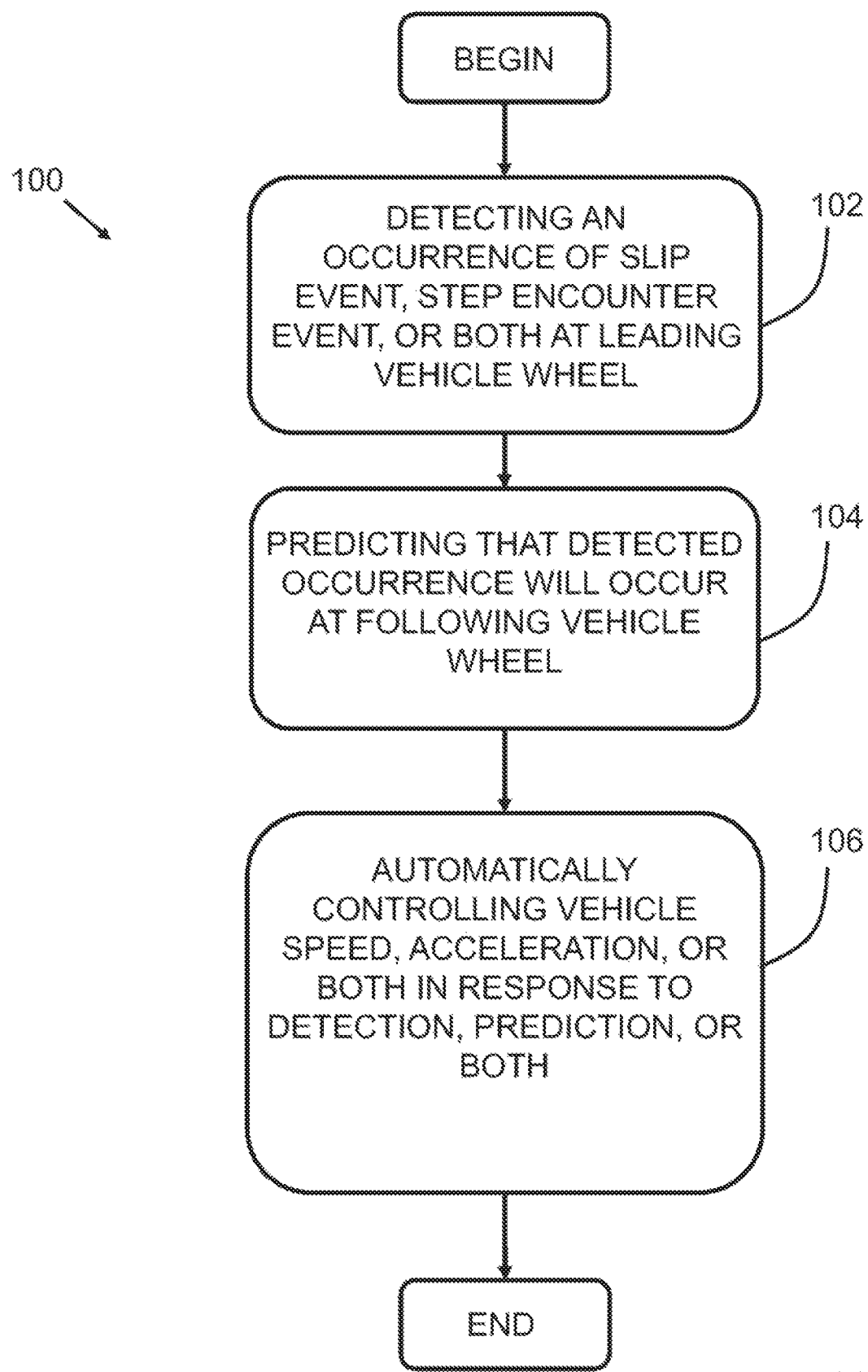
FIG. 5 is a flow diagram of a method for controlling the speed of a vehicle, such as the vehicle illustrated in FIGS. 1 and 2.

Turning now to FIG. 5, there is shown an example of a method 100 for controlling the speed of a vehicle through the operation of a speed control system, such as an off-road speed control system. For purposes of illustration and clarity, method 100 will be described in the context of vehicle 10 illustrated in FIGS. 1 and 2 and described above. More specifically, method 100 will be described in the context of the low-speed progress (LSP) control system 28 of vehicle 10, which, for purposes of illustration, is integrated in VCU 16 (i.e., VCU 16 comprises ECU 42 of LSP control system 28). It will be appreciated however, that the application of the present methodology is not meant to be limited solely to such an arrangement, but rather method 100 may find application with any number of other speed control system arrangements, including, for example, LSP control systems other than that described above (e.g., not integrated into the VCU of a vehicle, and/or the VCU does not comprise the ECU of the speed control system), as well as, in certain instances, conventional "on-highway" cruise control systems, such as, for example, cruise control system 26 described above. Accordingly, the present invention is not meant to be limited to any one particular arrangement or type of speed control system. Additionally, it will be appreciated that the performance of method 100 is not meant to be limited to any one particular order or sequence of steps.

In an embodiment, method 100 comprises a step 102 of detecting an occurrence of a slip event, a step encounter event, or both a slip event and step encounter event at a leading wheel of vehicle 10. This step may also include monitoring the response of the leading wheel to the terrain over which the leading wheel is traversing and traveling; this terrain may be referred to as the monitored terrain. The detected occurrence, or the monitored wheel response, may be a slip event including, for example, slip between a vehicle tire and the monitored terrain when the force exerted by the vehicle tire exceeds the traction available to the vehicle tire, or another type of similar event. The detected occurrence, or the monitored wheel response, may be, in addition to or instead of the slip event, a step encounter event including, for example, an encounter with a boulder, a step, a rock, a curb, a pothole, or another type of similar encounter. The leading wheel of vehicle 10 can be a front wheel or a rear wheel, depending on the direction of travel that vehicle 10 is moving.

Wheel traction, that is to say generally the maximum amount of torque that can be applied by a vehicle wheel to the terrain or ground below the wheel before there is a slip event between the wheel and the ground will, in some instances, depend on physical properties of the terrain or ground traversed by the wheel. In addition, wheel behavior will also be dependent in part or more upon the terrain or ground over which the wheel is traversing. Where individual wheel speed is measured by suitable means—such as that described in this description—the speed of multiple wheels associated with the same axle may be compared with one another. Similarly, wheel speeds associated with one axle may be compared with those of another, either as discrete speed values, or as values compared to an average value, in ways known in the art, so as to determine and detect if a wheel has experienced a slip event. Of course, other ways of determining and detecting a slip event are possible.

Wheel articulation and acceleration relative to vehicle 10 may also be monitored as a means to determine and detect when a wheel has encountered an obstacle and therefore has experienced a step encounter event. The obstacle may be a step, which may result in a momentary reduction of wheel speed compared to the other wheels of vehicle 10, as a result of the sudden increase in loading of the wheel as vehicle 10 attempts to negotiate the step. Alternatively, the obstacle may be a pothole, where the wheel is temporarily no-longer in contact with the terrain or ground. This sudden unloading of the wheel would tend to result in a momentary sudden increase in wheel speed relative to the other vehicle wheels. Of course, other ways of determining and detecting a step encounter event are possible.

Step 102 may also include monitoring vehicle related information and using the monitored information in order to detect the occurrence of the event(s). This may include receiving one or more electrical signals representative of vehicle-related information. The electrical signals, which may originate from any number of sources, including, but not limited to, one or more of vehicle sensors 14, one or more of vehicle subsystems 12, one or more memory devices (e.g., memory device 22 of VCU 16), or any other suitable or appropriate device or component of vehicle 10, may represent any number of types of information related to the vehicle.

One type of information may be the type of terrain over which the vehicle is travelling (e.g., snow, water, sand, gravel, boulders, mud, grass, etc.), and/or one or more characteristics of that terrain (e.g., roughness). In an embodiment, VCU 16 may receive electrical signals representative of this information from another subsystem or component of the vehicle. For example, the appropriate vehicle subsystem 12 may be queried and the appropriate terrain information (e.g., type, characteristic(s), etc.) received therefrom. In another embodiment, this information may already be stored in a memory device of or accessible by the component or device configured to perform method 100, and thus, the information may be received from that memory device. For example, in an instance wherein VCU 16 is configured to perform at least certain steps of method 100, the information may be stored in memory device 22 of VCU 16, and thus, processing device 24 of VCU 16 may receive the information from memory device 22.

Another type of information may be that needed to determine, detect, or sense the type and/or one or more characteristics of the terrain over which the vehicle is travelling (also referred to as the "prevailing terrain"). For example, electrical signals representative of information relating to a variety of operational or operating parameters of vehicle 10 may be received from one or more vehicle sensors 14 and/or one or more subsystems 12, including, for example, those described above with respect to the illustrative process for determining terrain type and/or characteristics thereof. The received information may then be evaluated and used in, for example, the manner described above, to determine the desired terrain-related information. For example, in an embodiment wherein VCU 16 is configured to perform at least certain steps of method 100, VCU 16 may receive electrical signals representative of information relating to a variety of operational or operating parameters of the vehicle 10 from one or more vehicle sensors 14 and/or one or more subsystems 12, including, for example, those described above with respect to the illustrative process for determining terrain type and/or characteristics thereof. VCU 16 may then evaluate and use the received information in, for example, the manner described above to determine the desired terrain-related information.

Similar to the above, yet another type of information may be that related to one or more operational or operating parameters of the vehicle, and may include, but is not limited to, that information used to determine or derive the terrain-related information described above. This information may include, for example, that related to one or more of: wheel slip; wheel torque; wheel speed; wheel articulation; ride height; tire pressure; vehicle attitude (e.g., pitch, yaw, and roll of the body of the vehicle); tire drag; tire friction; the frequency and/or amplitude of vibrations in or of the body of the vehicle; steering wheel angle; steerable road wheel angle and/or a rate of change thereof; lateral acceleration of the vehicle; terrain response (TR) mode; rolling resistance; gear selection; and/or other parameters influencing vehicle body movement, to cite a few possibilities. Electrical signals representative of one or more operational parameters of vehicle 10 may be received from one or more vehicle sensors 14 and/or one or more subsystems 12, including, but not limited to, those described above, or from another appropriate component of vehicle 10. For example, in an embodiment wherein VCU 16 is configured to perform at least certain steps of method 100, VCU 16 may receive electrical signals representative of one or more operational parameters of vehicle 10 from one or more vehicle sensors 14 and/or one or more subsystems 12, including, but not limited to, those described above, or from another appropriate component of the vehicle 10.

While only certain types of information have been explicitly described above, it will be appreciated that the present invention is certainly not meant to be limited to only those types of information. Rather, information in addition to or instead of that described above may also be acquired or received and used in the same manner as that described in greater detail below. Accordingly, the present invention is not limited to any one or more particular type(s) of information. Additionally, while the description above has been primarily with respect to VCU 16 performing step 102, it will be appreciated that in other embodiments, components of vehicle 10 other than VCU 16 may be configured to perform this step.

Method 100 further comprises a step 104 of predicting that the occurrence of the event(s) of step 102 will occur at a following wheel of vehicle 10. Again here, the following wheel of vehicle 10 can be a front wheel or a rear wheel, depending on the direction of travel that vehicle 10 is moving. The step 104 may more particularly predict when the occurrence of the event(s) of step 102 will occur at the following wheel. The prediction of step 104 may be made based on one or more of the following: a speed at which vehicle 10 is travelling, an angle in which the leading wheel is directed, an angle at which steering wheel 32 is turned or rotated, or a wheelbase distance measured between the leading wheel and the following wheel. Depending on the embodiment, the prediction may be based on a duration of time of vehicle travel, a distance traveled, or both.

Method 100 yet further comprises a step 106 of automatically controlling a vehicle speed, a vehicle acceleration, or both a vehicle speed and acceleration in response to the detection of step 102, the prediction of step 104, or both the detection and prediction of steps 102 and 104. In one embodiment of step 106, intervention and interruption of one or more vehicle subsystem(s) 12 that may otherwise occur upon the detection of step 102 is suspended and precluded from occurring. For example, intervention by powertrain subsystem 12₁, chassis control or management subsystem 12₂, or both powertrain subsystem 12, and chassis control or management subsystem 12₂ may be precluded from occurring. In another embodiment of step 106, powertrain subsystem 12, is controlled and commanded by, for example LSP control system 28, to make torque adjustments applied to the leading wheel, the following wheel, or to both the leading and following wheels at a time to coincide with, or prior to, when the prediction of step 104 will occur. The adjustments to the applied torque may involve increasing or reducing torque to the leading wheel, following wheel, or both concurrently or independently; this is described in greater detail below. In yet another embodiment of step 106, brake subsystem 12₃ is controlled and commanded by, for example LSP control system 28, to apply a retarding torque to the following wheel at approximately when the detected occurrence of step 102 is predicted to occur by step 104 at the following wheel; again, this is described in greater detail below.

Method 100 may yet further comprise a step of automatically controlling acceleration (not shown in FIG. 5) of vehicle speed from a first set-speed of LSP control system 28 to a second set-speed of LSP control system 28 in response to the detection and prediction steps 102 and 104. This step may include temporarily suspending acceleration of vehicle speed that is commanded by LSP control system 28, temporarily holding or maintaining current and prevailing vehicle speed, or a combination of both. The functionality in this step may be performed for a duration of time representative of the prediction of step 104. This step too is described in greater detail below.

Figure 6:
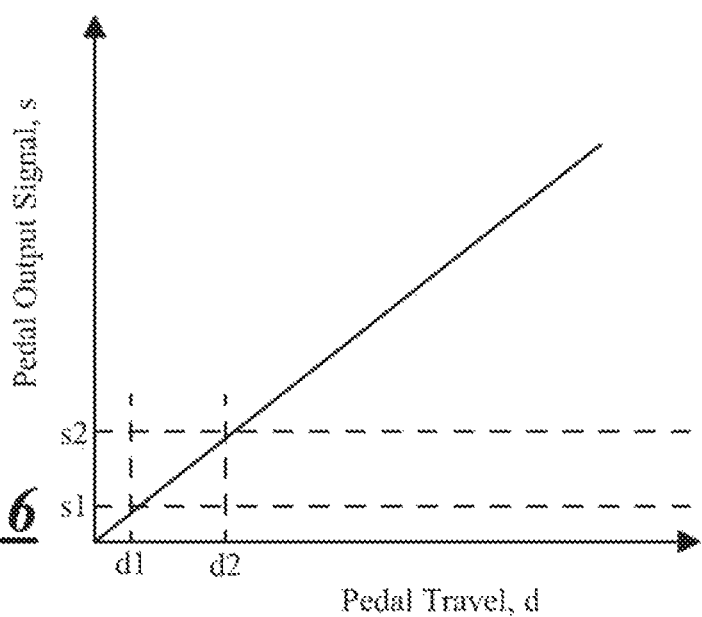
FIG. 6 shows a plot of pedal output signal (s) as a function of pedal travel (d) in a vehicle, such as the vehicle illustrated in FIGS. 1 and 2.

Turning now to FIG. 6, the figure is a plot of pedal output signal (s) as a function of accelerator or brake pedal travel (d) being the amount by which pedal 18, 20 has been pressed (measured for example in terms of linear translation or angular rotation or a proportion of full scale deflection). In the arrangement shown, the pedal output signal increases in a substantially linear manner as a function of travel, although other arrangements are also useful. In response to the pedal output signal (s), brake subsystem 12₃ is operable to apply brakes of vehicle 10 and VCU 16 is operable to change the amount of torque developed by the engine or electric motor 202. In one embodiment, brake subsystem 12₃ is arranged not to apply the brakes of vehicle 10 and VCU 16 is arranged not to change the amount of torque developed by the engine or electric motor 202 unless the amount of pedal travel exceeds a threshold distance d2 illustrated in FIG. 6.

In general, use of speed control at low speeds—such as via LSP control system 28—when driving off-road could potentially offer a user considerable advantages in reduced user workload and enhanced vehicle composure. But if the user attempts to use the speed control off-road, a powertrain/traction controller may attempt to intervene when a slip event or step encounter event is detected. This intervention may have twice the effect if the slip or step encounter event is first detected at a leading wheel and subsequently at a following wheel situated after the leading wheel of vehicle 10. This intervention may cause the suspension of speed control functionality via LSP control system 28 altogether.

In one aspect of the present invention for which protection is sought, there is provided a speed control system, such as LSP control system 28, that may be provided with information in respect of at least one selected from amongst terrain over which the vehicle is driving, vehicle attitude, wheel articulation, wheel speed, gear selection, tire friction, rolling resistance and selected terrain response (TR) mode. In vehicles not having one or more terrain response modes such information is not provided.

In one aspect of the invention, an off-road speed control system (e.g., LSP control system 28) according to an embodiment of the present invention is arranged to detect patterns in the occurrence of slip events and/or step encounter events and to monitor vehicle speed and optionally steerable road wheel angle and/or steering wheel angle; this may be a part of step 102. The detection of patterns may involve continually monitoring wheel torque, wheel slip, and/or rolling resistance at the leading wheel, and predicting the same pattern occurrence at the following wheel and controlling the following wheel similarly to the control of the leading wheel when the leading wheel experienced the pattern. In one embodiment, step 104 may include the system operating to predict where a slip event or step encounter event that is detected by a leading wheel is subsequently detected as a slip or step encounter event at a trailing or following wheel following the path of the leading wheel.

As described previously, an off road speed control system (e.g., LSP control system 28) according to an embodiment of the present invention may be operable to accelerate vehicle 10 to a new set speed if the set speed is increased whilst vehicle 10 is progressing over terrain. This may be part of the additional step described above for method 100. If whilst vehicle 10 is accelerating, a slip event at one or more wheels is detected or optionally an encounter with a step is detected, the speed control system may be operable temporarily to limit a further increase in vehicle speed. Where a slip event or step encounter event is detected at the leading wheel (such as a front wheel if the vehicle is travelling in a forward direction), the controller may be operable not to take identical action or action for the same duration if a subsequent slip or step encounter event is detected at the following wheel and it is determined to be in response to the following wheel passing over similar terrain to that which had already caused the leading wheel to slip. To this end, in some embodiments the system delay in resuming acceleration following detection of a slip event at a leading wheel may be based on a time proportional to vehicle speed and wheel base after leading wheel slip has fallen below a prescribed threshold. The prescribed threshold may be in the range from around 5% to around 20%. Other arrangements are also useful.

In some embodiments, an off-road speed control system (e.g., LSP control system 28) may be arranged to temporarily hold and maintain vehicle speed or suspend vehicle acceleration in the event a slip event, step encounter event, or both are detected. Vehicle speed may be held substantially at the level at which vehicle 10 first encountered the slip event or step encounter event, or reduced if the leading wheels continue to experience slip above a defined threshold. It will be appreciated that the system may be operable to hold speed or suspend acceleration regardless of user request whilst the speed control system is active. But it is to be understood that in some embodiments a user may override the speed control system and force an increase in powertrain torque for example by cancelling speed control system operation or user actuation of an accelerator or brake control by a sufficient amount.

In some embodiments, acceleration is only resumed towards the increased set-speed chosen by the user once the slip event has ceased or the step encounter event has been mounted and overcome. In this way, the speed control system will accept an increase in set-speed when active off-road, but only attempt to achieve the set-speed where traction permits.

In some embodiments of the off-road speed control system, a slip event or a step encounter event detected first by one or more leading wheel(s) in step 102 followed by a corresponding one or more trailing or following wheel(s) may be dealt with differently relative to a situation in which where a slip event or step encounter is detected at one or more leading wheels alone.

In an embodiment the controller predicts the path over terrain that the front (e.g., leading) and rear (e.g., following) tires will follow and the time delay between a leading tire passing over a fixed point and a following tire encountering the same fixed point. Where a slip event or presence of a curb, for example, is detected at one or more rear or following wheels, and it has been predicted by the controller as being highly likely based on there having been a slip event or curb encounter at a wheel in front (leading) at a time proportional to the vehicle speed and wheelbase of vehicle 10, then the system takes action in response to the repeated slip or step encounter event appropriate to one or more prevailing conditions such as the amount of slip or steepness of the step. In vehicles having one or more terrain response (TR) modes of operation the off-road speed control system may take into account a selected terrain setting of a terrain response system. It is to be understood that embodiments of the invention are intended to be capable of enabling vehicle 10 to avoid allowing the same patch of low-mu (i.e., low coefficient of friction) driving surface from having double the effect on vehicle acceleration if both leading and following tires or wheels on the same side of the vehicle pass over it. Similarly, in the case of a step, embodiments of the invention are intended to enable a speed control system to accelerate the vehicle to a set speed as quickly and efficiently as possible without reducing vehicle composure and thereby maintain a comfortable ride for vehicle occupants.

In some embodiments the off-road speed control system may be operable to control or otherwise influence gear and/or 'high/low' ratio selection (where applicable), ensuring that when the vehicle is travelling at low speeds off-road a selected gear and/or ratio is appropriate to avoid engine stalling and maintain suitable progress.

It is envisaged that some embodiments of the present invention may be able to work with HDC®/Hill Hold Assist, so as to optimize vehicle composure even when negotiating obstacles on steep gradients. In some embodiments HDC/Hill Hold Assist braking commands are arranged to override or otherwise take priority over an off-road speed control system commands if the gradient on which the vehicle is travelling is greater than a pre-determined value and/or the speed is below a pre-determined threshold.

It is envisaged that the rate of acceleration from a current speed to a changed set-speed may be influenced by pre-set performance characteristics dictated by Terrain Response in dependence on Terrain Mode.

Embodiments of the present invention may greatly reduce the effects of tire erosion on off-road routes and improves tire wear and fuel consumption. Embodiments of the invention may further improve vehicle composure by adapting to available levels of grip and resisting over-revving of the engine.

As described above, it is to be understood that in some embodiments of method 100 if a slip event occurs or a step is encountered by one or more leading wheels and it is determined that one or more following wheels will pass within a prescribed distance of a path of a leading wheel, the system may control operation of the vehicle in such a manner as to reduce an effect on rate of vehicle progress and/or occupant comfort of the terrain causing the slip or step encounter event. The reduction in the effect on rate of progress and/or occupant comfort may be relative to that which would be experienced by the following wheel if anticipatory action were not taken by the speed control system. In some embodiments of method 100, in response to detection of a slip or step encounter event (step 102), an off road speed control system may redistribute powertrain torque between one or more vehicle wheels so as to reduce an amount of torque applied to a following wheel when it passes within the prescribed distance of the location at which the leading wheel experienced slip or encountered the step (steps 104 and 106). It is to be understood that in some arrangements the prescribed distance may be sufficiently low (optionally substantially equal to zero) that a path of the following wheel must pass over a path of the leading wheel in order to invoke a torque redistribution response by the off-road speed control system. Redistribution of torque may be performed by means of one or more powertrain clutches, optionally by means of a rear, centre or front differential arrangement.

In some embodiments of step 106, the off-road speed control system may be configured to reduce the amount of torque applied to the following wheel to a value at which slip of the leading wheel was reduced, and/or to a value below a prescribed value (for example to or below 20%). The reduction may be effected when the following wheel comes within a prescribed distance of the terrain that caused a slip or step encounter at a leading wheel in some embodiments although other arrangements are also useful.

In some embodiments of step 106, the off-road speed control system may reduce the amount of torque applied to the following wheel substantially to zero. In some embodiments of step 106, the speed control system may be operable to increase the amount of torque applied to a leading wheel when the following wheel subsequently comes within a prescribed distance of the leading wheel. In some embodiments the change in torque distribution may be made for one selected from amongst a period of time or for a distance traveled corresponding to that for which slip was experienced by a leading wheel. Other arrangements are also useful.

It is to be understood that increasing temporarily an amount of torque applied to a leading wheel may be appropriate in some circumstances where it is important to obtain as much traction as possible. In some embodiments having a front mounted engine, front wheels of the vehicle may typically carry a greater proportion of vehicle weight than rear wheels, optionally depending on vehicle loading, due to the presence of an engine and transmission at a front of a vehicle. Accordingly, greater traction may be available from the front wheels in some circumstances.

In some embodiments of step 106, when it is predicted that a following wheel may encounter slip due to detection of such an encounter at a leading wheel, brake intervention may be applied. In some embodiments of step 106, a brake force may be applied to one or more following wheels, acting against powertrain torque so as to reduce a risk of wheel flare in the event an area of low coefficient of friction is encountered.

In some embodiments of step 106, when it is predicted that a following wheel may encounter a slip event and/or step encounter event due to detection of such an event at a leading wheel, brake intervention may be applied. In some embodiments a brake force may be applied to one or more following wheels, acting against powertrain torque so as to reduce a risk that an occupant of the vehicle experiences a variation in speed which may give rise to the vehicle body being perceived by the occupant as the vehicle lurching when negotiating a step in terrain, for example due to the present of a boulder, rock formation or a step.

Embodiments of the invention will now be described by way of example with reference to the accompanying drawings. Operation of vehicle 10 according to an embodiment of the present invention will be described by reference to FIG. 7. Vehicle 10 is operated in a four wheel drive mode in which powertrain torque is be applied via powertrain subsystem 12$_1$ to each of the four wheels shown (front two wheels, rear two wheels) as vehicle 10 is driven.

Figure 7:
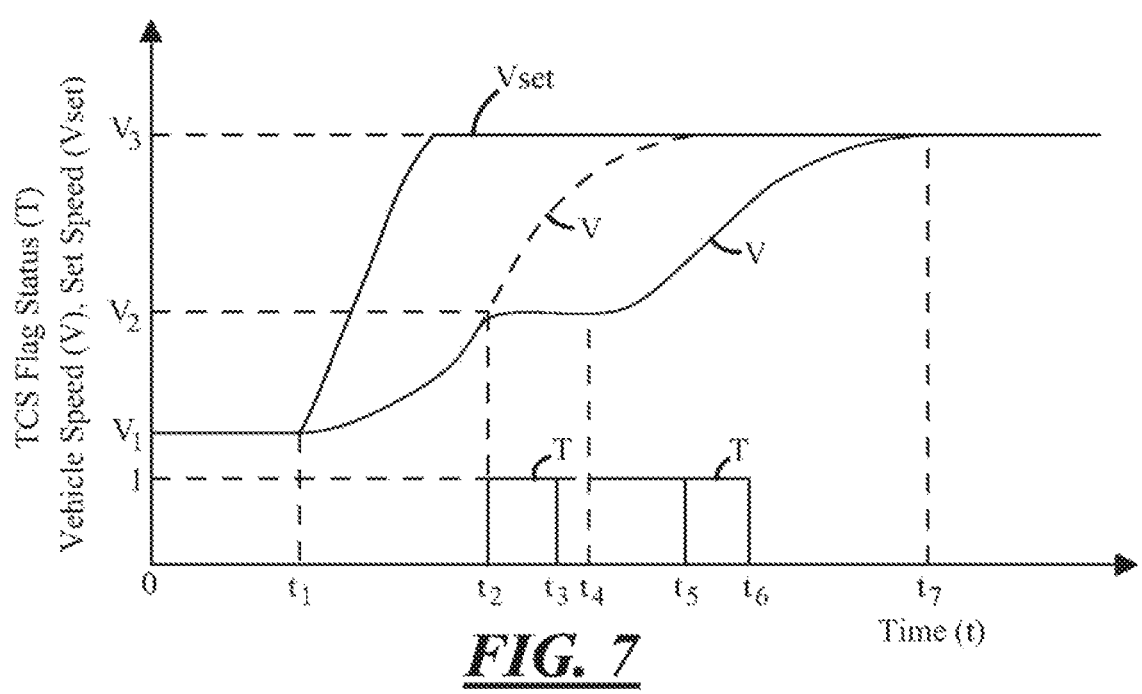
FIG. 7 is a plot of vehicle speed (V), set speed (Vset), and traction control system (TCS) flag status (T) as a function of time (t) for a vehicle, such as the vehicle illustrated in FIGS. 1 and 2.

FIG. 7 is a plot of vehicle speed (V), LSP control system 28 set speed set by a user (Vset), and traction control system (TCS) flag status (T) as a function of time (t) as vehicle 10 climbs a hill of a given gradient. The hill has patches of relatively low coefficient of surface friction (e.g., wet grass, mud, or the like). At time t=0, vehicle 10 is ascending the hill under the control of LSP control system 28 and at user set speed Vset=V=V1. At time t=t1, the user holds accelerator pedal 20 of vehicle 10 depressed by an amount within the range d=d1–d2 (FIG. 6) causing the set speed to increase from Vset=V1 to Vset=V3. LSP control system 28 causes vehicle 10 to accelerate towards speed V=V3, ensuring that the rate of acceleration remains within the prescribed corridor, for example, +0.1 g-0.2 g.

At time t=t2, the TCS flag is set to T=1 as leading wheels of vehicle 10 encounter an area of relatively low coefficient of friction and suffer an excessive slip event. LSP control system 28 responds by suspending further acceleration and seeks to hold vehicle speed at V=V2. Vehicle wheel speeds are therefore reduced to, or maintained at, values corresponding to the vehicle speed immediately prior to the occurrence of the slip event. In some embodiments, in addition brake subsystem 12$_3$ may apply brake force to the one or more wheel(s) that have suffered the slip event, acting against powertrain torque, in order to reduce a risk of flare by providing a retarding force against which the powertrain may act.

At time t=t3, the TCS flag is set to T=0 indicating that the excessive wheel slip event is no longer occurring. LSP control system 28 now resumes its response to the user defined set-speed request and seeks to accelerate vehicle 10 to the achieve user set speed V=V3.

LSP control system 28 calculates a path of the following wheels with respect to the leading wheels of vehicle 10 as the vehicle continues from the location at which the TCS flag was set to T=1. If LSP control system 28 determines that one or more following wheels are likely to pass within a first prescribed distance of the location at which motion of one or more leading wheels resulted in the TCS flag being set to T=1, LSP control system 28 calculates a path of one or more following wheels over ground or terrain. This determination is made in light of a position of steerable road wheels (in this case, leading wheels) of vehicle 10 and/or an angular position of steering wheel 32.

If one or more following wheels do come within the first prescribed distance of the location at which motion of one or more leading wheel(s) resulted in the TCS flag being set to T=1, LSP control system 28 is configured to command that a braking torque be applied to the one or more following wheel(s) acting against powertrain torque applied to the one or more wheel(s), and/or momentarily shift drive torque away from the one or more wheel(s) to another wheel that is determined to have a lower risk of experiencing an excessive slip event. This reduces a risk of flare of the following wheels if they encounter a similar driving surface (having a relatively low surface coefficient of friction) to the leading wheels. In some embodiments, in addition, LSP control system 28 increases the amount of torque applied to the leading wheels of vehicle 10 when braking torque is applied to the following wheels in order to compensate for a reduction in net torque applied to the following wheels.

In some embodiments, LSP control system 28 does not calculate a path of the following wheels relative to that of the leading wheels, but commands application of the braking torque or shifting of powertrain torque between wheels when the following wheels have traveled a distance corresponding to the length of wheelbase between the leading and following wheels of vehicle 10 from the position at which TCS flag T was set to T=1. The distance may be slightly less than the length of the wheelbase in some embodiments. It is to be understood that this may allow time for the drivetrain to react and that that action has a useful and stabilizing effect on vehicle composure.

The first prescribed distance may be around 1 m in some embodiments, although other values are also useful.

In some embodiments of step 106, in addition to or instead of commanding application of braking torque to the following wheels, LSP control system 28 may redistribute powertrain torque between the following wheels and the leading wheels such that the amount of torque applied to one or more following wheel(s) is reduced and the amount applied to one or more leading wheel(s) is increased. This has the advantage that when the following wheels pass over the area of reduced surface coefficient of friction a risk that the following wheels suffer excessive slip, triggering intervention by TCS system, is reduced. That is, LSP control system 28 may command increasing the amount of torque applied to leading wheels to compensate for a reduction in net torque applied to the following wheels. It is to be understood that this action may be helpful in reducing an effect of the region of driving surface of reduced surface coefficient of friction on the rate of progress of the vehicle across terrain.

It is to be understood that in some embodiments of step 104, LSP control system 28 may calculate a path of a left hand following wheel with respect to the path of a left hand leading wheel, and the path of a right hand following wheel with respect to the path of a right hand leading wheel independently of one another. Alternatively, LSP control system 28 may calculate the path for each wheel in relation to a single, leading wheel dependent on the direction of vehicle travel.

In an embodiment, LSP control system 28 may be operable to apportion more torque to one or more wheels on a harder packed, higher grip surface in order to manage slip and improve vehicle composure.

In one example of vehicle operation, vehicle 10 may move from a hard-packed surface to a relatively softer surface and then back to a hard-packed surface. As the vehicle moves onto the soft surface, the system may be arranged to apportion more torque to one or more following wheels so as to push the vehicle onto the soft surface. When subsequently exiting the soft surface, the system may be operable to apportion greater torque to the leading wheels, so as to pull the vehicle onto the hard packed surface. The system monitors a response of the vehicle body to one or more external forces and to apportion torque between wheels so as to enhance vehicle composure.

In some embodiments of step 106, a speed control system may alternatively increase an amount of torque applied to one or more wheels experiencing relatively high drag in order to compensate for the relatively high drag.

In some embodiments the speed control system may be operable to determine whether to increase torque to wheels experiencing higher drag or lower drag in dependence on a determination as to which option would deliver optimum vehicle composure.

Embodiments of the present invention have the advantage that an amount of slip of one or more following wheels may be reduced relative to one or more leading wheels by anticipating slip of the one or more following wheels when they encounter areas of a surface that are known to be of reduced surface coefficient of friction, based on previously detected slip events in respect of the one or more leading wheels.

It will be understood that the embodiments described above are given by way of example only and are not intended to limit the invention, the scope of which is defined in the appended claims. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Further, the terms "electrically connected" or "electrically coupled" and the variations thereof are intended to encompass both wireless electrical connections and electrical connections made via one or more wires, cables, or conductors (wired connections). Other terms are to be construed using their broadest reasonable meaning unless they are used in a context that requires a different interpretation.

The invention claimed is:

1. A method of operating a speed control system of a vehicle having an electronic control unit (ECU), comprising:
   detecting by the ECU an occurrence of at least one of a slip event and a step encounter event at a leading wheel of the vehicle;
   predicting by the ECU that an occurrence of said at least one of a slip event and a step encounter event will occur at a following wheel of the vehicle, wherein the prediction is based upon a combination of two or more of a speed of the vehicle, an angle of the leading wheel, an angle of a steering wheel of the vehicle, or a wheelbase distance between the leading wheel and the following wheel; and
   automatically controlling by the ECU at least one of vehicle speed and vehicle acceleration in response to said predicting.

2. A speed control system for a vehicle, comprising:
an electronic control unit (ECU), the ECU configured to:
  detect an occurrence of at least one of a slip event and a step encounter event at a leading wheel of the vehicle;
  predict that an occurrence of said at least one of a slip event and a step encounter event will occur at a following wheel of the vehicle, wherein the ECU is configured to make the prediction based upon a combination of two or more of a speed of the vehicle, an angle of the leading wheel, an angle of a steering wheel of the vehicle, or a wheelbase distance between the leading wheel and the following wheel; and
  output a signal to automatically control at least one of vehicle speed and vehicle acceleration in response to said predicting.

3. The system of claim 2, wherein detecting an occurrence of at least one of a slip event and a step encounter event by the ECU further comprises the ECU being configured to monitor vehicle related information including one or more of: wheel speed, wheel torque, and wheel articulation and to use said monitored vehicle related information to detect said occurrence.

4. The system of claim 2, wherein the detecting, predicting, and outputting are performed by the ECU while maintaining operation of the speed control system and without deactivation of the speed control system.

5. The system of claim 2, wherein the predicting that an occurrence of said at least one of a slip event and a step encounter event will occur at a following wheel further comprises the ECU being configured to make the prediction based upon at least one of a speed of the vehicle, an angle of the leading wheel, an angle of a steering wheel of the vehicle, and a wheelbase distance between the leading wheel and the following wheel.

6. The system of claim 2, further comprising the ECU being configured to output a signal to control acceleration of vehicle speed from a first set-speed of the speed control system to a second set-speed of the speed control system based upon said prediction.

7. The system of claim 6, wherein the output of a signal to control acceleration of vehicle speed comprises the ECU being configured to output a signal to either temporarily suspend acceleration of vehicle speed commanded by the speed control system or temporarily maintain current vehicle speed.

8. The system of claim 7, wherein the ECU is configured to:
  predict when the occurrence of said at least one of a slip event and a step encounter event will occur at the following wheel; and
  output a signal to temporarily suspend acceleration of vehicle speed commanded by the speed control system and temporarily maintain current vehicle speed for a duration of time representative of the prediction of when the occurrence of said at least one of a slip event and a step encounter event will occur at the following wheel of the vehicle.

9. The system of claim 6, wherein the output of a signal to control acceleration of vehicle speed comprises the ECU being configured to detect if the leading wheel continues to experience a slip event above a defined threshold and, in response thereto, to output a signal to temporarily reduce vehicle speed.

10. The system of claim 9 wherein temporarily reducing vehicle speed comprises the ECU being configured to output a signal to temporarily reduce vehicle speed until the detected slip event falls below a predetermined threshold.

11. The system of claim 2, wherein the output of a signal to automatically control at least one of vehicle speed and vehicle acceleration comprises the ECU being configured to suspend intervention of the speed control system by a powertrain subsystem, a chassis management subsystem, or both the powertrain and chassis management subsystems.

12. The system of claim 2, wherein the output of a signal to automatically control at least one of vehicle speed and vehicle acceleration comprises the ECU being configured to output a signal to control a powertrain subsystem to adjust the amount of torque applied to a leading wheel, to a following wheel, or to both a leading and following wheel, based upon the predicting that the occurrence of said at least one of a slip event and a step encounter event will occur at the following wheel of the vehicle.

13. The system of claim 12, wherein the output of a signal to control the powertrain subsystem comprises the ECU being configured to output a signal to: reduce the amount of torque applied to the following wheel approximately when the predicted occurrence of said at least one of a slip event and a step encounter event will occur at the following wheel, increase the amount of torque applied to the leading wheel approximately when the predicted occurrence of said at least one of a slip event and a step encounter event will occur at the following wheel, or both.

14. The system of claim 13, further comprising the ECU being configured to output a signal to temporarily reduce the amount of torque applied to the leading wheel in response to the predicting that the occurrence of said at least one of a slip event and a step encounter event will occur at the following wheel of the vehicle, and wherein the reduction of the amount of torque applied to the following wheel is equal to a reduction of the amount of torque applied to the leading wheel when the occurrence of at least one of slip event and step encounter event was detected at the leading wheel.

15. The system of claim 14, further comprising the ECU being configured to output a signal to both reduce the amount of torque applied to the following wheel and increase the amount of torque applied to the leading wheel, and wherein the reduction of the amount of torque applied to the following wheel is equal to an increase in the amount of torque applied to the leading wheel.

16. The system of claim 2, wherein the output of a signal to automatically control at least one of vehicle speed and vehicle acceleration in response to said predicting comprises the ECU being configured to output a signal to control a brake subsystem to apply a retarding torque to the following wheel approximately when the occurrence of said at least one of a slip event and a step encounter event at the following wheel is predicted to occur.

17. A vehicle comprising a speed control system, the speed control system comprising:
an electronic control unit (ECU), the ECU configured to:
  detect an occurrence of at least one of a slip event and a step encounter event at a leading wheel of the vehicle;
  predict that an occurrence of said at least one of a slip event and a step encounter event will occur at a following wheel of the vehicle, wherein the ECU is configured to make the prediction based upon a combination of two or more of a speed of the vehicle, an angle of the leading wheel, an angle of a steering wheel of the vehicle, or a wheelbase distance between the leading wheel and the following wheel; and output a signal to automatically control at least one of vehicle speed and vehicle acceleration in response to said predicting.

\* \* \* \* \*